United States Patent [19]

Muller et al.

[11] 4,105,545

[45] Aug. 8, 1978

[54] PROCESS FOR REMOVING CYANIDE-CONTAINING COMPONENTS FROM AQUEOUS MEDIA

[75] Inventors: Albert Muller, Lebanon, N.J.; John M. Schreiner, Brewster, N.Y.

[73] Assignee: Treadwell Corp., New York, N.Y.

[21] Appl. No.: 723,205

[22] Filed: Sep. 14, 1976

[51] Int. Cl.$^2$ .................................................. C02B 1/38
[52] U.S. Cl. ........................................ 210/15; 210/44; 210/54; 210/63 Z; 210/DIG. 31
[58] Field of Search .................. 210/44, 50, 51, 63 Z, 210/DIG. 31, 11, 15, 54

[56] References Cited

U.S. PATENT DOCUMENTS

| | | | |
|---|---|---|---|
| 3,238,127 | 3/1966 | Sebba | 210/44 |
| 3,843,516 | 10/1974 | Yamada et al. | 210/DIG. 31 |
| 3,920,547 | 11/1975 | Garrison | 210/DIG. 31 |

FOREIGN PATENT DOCUMENTS

| | | | |
|---|---|---|---|
| 708,215 | 4/1965 | Canada | 210/44 |
| 1,210,492 | 10/1970 | United Kingdom | 210/DIG. 31 |

*Primary Examiner*—Charles N. Hart
*Assistant Examiner*—Peter A. Hruskoci

[57] ABSTRACT

A process for removing cyanide-containing components from aqueous media, particularly weak ammonia liquors, is provided comprising:

(a1) contacting said media with bubbles in the presence of a collector to remove a substantial amount of complexed and simple cyanides therefrom, and (b1) contacting said media with ozone to substantially remove the remaining cyanides therefrom.

6 Claims, No Drawings

PROCESS FOR REMOVING CYANIDE-CONTAINING COMPONENTS FROM AQUEOUS MEDIA

BACKGROUND OF INVENTION

This invention is concerned with a method for treating cyanide laden waste water effluents derived from coke-oven operations, blast furnace blowdown and other industrial wastewater.

The treatment of aqueous effluents from coke oven operations for discharge to receiving bodies without harm to the environment is a major problem facing the steel industry. These wastes are complex in composition, time-varying in rate of production and constitute one of the major pollution sources associated with steelmaking. The waste liquors from coking operations, for example, contain many of the by-products of the pyrolysis reactions which occur during the high temperature carbonization of coal. From the standpoint of water pollution, it is necessary to greatly reduce the contaminants contained in such streams, particularly phenols and cyanides, free and fixed ammonia, free and emulsified oils, and various suspended solids, including sulfides. The treatment and removal of such residual contaminants involves sophisticated chemical techniques and high costs.

In the past, various process schemes have evolved for recovering and treating the volatile products of coking operations. For the high temperature carbonization process used to produce metallurgical coke in slot-type ovens, for example, the gaseous mixture leaving the ovens consists of dust, permanent gases, e.g., hydrogen, methane, carbon monoxide, carbon dioxide, nitrogen etc., having a fuel value of about 550 Btu/cubic foot, together with vapors which are condensed and separated to produce crude tar, light oil (benzol) and ammonia liquor. The latter products are then further processed and refined to produce a myriad of chemicals for commercial sale.

In one of the most generally used recovery systems, the gas leaving the coke ovens is first contacted with continuously recirculated aqueous sprays which cool the gas from about 1500° to 185° F. This condenses most of the tar which is subsequently decanted from the cooling water. The gas is then further cooled to 75°–95° F by further washing with ammonia liquor to condense more tar which is then separated and recovered. Final tar removal (tar fog) is accomplished by passage through electrostatic precipitators.

The next step in the gas treatment after tar removal is the recovery of ammonia. This is usually accomplished by contacting the gases from the tar separation step with a solution containing 5% free sulfuric acid. Crystals of ammonium sulfate which form in the contacting step are separated by centrifuging, dried and then sold for use as a fertilizer component. After sulfate removal the residual aqueous stream is further stripped of ammonia by steam distillation in an ammonia still. Steam distillation makes it possible to further reduce the ammonia level in this stream. The additional ammonia thus recovered is recirculated to the sulfuric acid scrubbers and recovered as ammonium sulfate.

Other methods of ammonia recovery can be employed such as washing the gas with water in a series of scrubbers, mixing the liquor so-formed with other liquor from the collecting mains and distilling. Still other methods employ phosphoric acid in the scrubbers to produce mono- or di-ammonium phosphate or absorb the vapors from the ammonia still in water to form a 15-25% aqueous solution of ammonia. Regardless of which ammonia recovery method is used, a final aqueous weak ammonia liquor (WAL) waste is formed which must be treated prior to final discharge to a receiving body.

That portion of the ammonia which exists as the salt of a weak acid is considered "free" and is liberated by simple boiling during distillation in the ammonia still while the "fixed" ammonia existing as chlorides or thiocyanates requires liberation by the addition of lime before it can be recovered by distillation. Accurate control of the lime slurry addition in the "lime leg" of the ammonia still is of critical importance in achieving a low ammonia containing effluent.

The next step in gas processing is light oil recovery which is accomplished by further cooling the gases from the ammonia scrubber with water to 70°–75° F. This results in the condensation of napthalene which can be removed as crystals from the wash water or by various solution and distillation techniques using selected petroleum fractions or solvents. The crude light oil containing benzene, toluene and xylene is recovered by contact with a petroleum wash oil in packed towers. The wash oil is then stripped with steam. The aqueous waste streams from these operations also contain appreciable amounts of contaminants and are usually mixed with the WAL prior to treatment.

The coke oven gas generally is given no further treatment and is used as a fuel for various purposes in the steel mills. In some cases, however, hydrogen sulfide is removed. A variety of methods can be used such as absorption by sodium carbonate-sodium bicarbonate solution followed by stripping under vacuum (vacuum carbonate process). The resultant sulfides are converted to elemental sulfur in a Claus kiln.

In summary, the treatment of the gaseous pyrolysis products resulting from the high temperature carbonization of coal to produce metallurgical coke generates three principal aqueous waste streams. These streams result from treatments to cover tar, ammonia, and light oils from the coke oven gas. The amount and composition of the contaminants in these waste streams varies with the type of coal blend being coked, the operating conditions for coking and the specific processes used to recover the tar, ammonia and light oils. As a result, after these streams are mixed it is difficult to generalize with respect to the composition of the aqueous waste stream that has to have further treatment before discharge to receiving bodies or to municipal sewage plants.

In general, the weak ammonia liquor (WAL) obtained after steam distillation of the rich ammonia liquor freed from tar and ammonium sulfate and which has been combined with the waste water contaminants after the light oil removal steps contains a large number of materials in small concentration such as ammonia, cyanides, phenols, oil and grease, thiocyanates, and suspended solids. Table I below illustrates a typical weak ammonia liquor composition before and after conventional treatments to remove contaminants contained therein.

TABLE I

| Components (ppm) | A Combined Aqueous Bio-Oxidation (ppm) | B Combined Aqueous Bio-Oxidation (ppm) |
|---|---|---|
| pH | 8.5 | 6.5 |

TABLE I-continued

| Components (ppm) | A Combined Aqueous Bio-Oxidation (ppm) | B Combined Aqueous Bio-Oxidation (ppm) |
| --- | --- | --- |
| BOD[1] | 2000 | 200 |
| COD[2] | 2570 | 455 |
| TOC[3] | 865 | 225 |
| $NH_3$ (total) | 55 | 65 |
| $NH_3$ (free) | 4 | 8 |
| $NH_3$ (fixed) | 51 | 57 |
| Cyanide (total) | 8 | 5 |
| (simple) | 4 | 1 |
| (complexed) | 4 | 4 |
| Oil and grease | 25 | 26 |
| Phenols | 440 | <0.25 |
| Suspended Solids | 245 | 100 |
| Thiocyanate | 200 | 10 |

[1]Biological Oxygen Demand
[2]Chemical Oxygen Demand
[3]Total Organic Carbon

The cyanides are present in the form of simple cyanides $(CN)^-$ and metal complexed cyanides. The complexed cyanides include ionized cyanides in solution such as $Fe(CN)_6^{4-}$, $[Fe(CN)_5.H_2O]^{3-}$, and Fe-$Fe(CN)_6^{-1}$; charged colloidal cyanides such as [Fe-$Fe(CN)_6$ $FeFe(CN)_6]^{2-}$ and solid particulate cyanides such as Fe (II) $[Fe(CN)_6$ Fe] and $Fe(II)$ $[Fe(CN)_6Fe]_2$. The cyanides may also be complexed with other cyanide-complexing metals although iron is the predominant metal in weak ammonia liquors. The type of complexed cyanide formed depends on the Fe/CN ratio. Generally as this ratio increases, more solid particulate cyanides are formed and as the ratio decreases, more ionized and charged colloidal cyanides are formed. Thiocyanates are also present in simple and complexed form. For purposes of brevity, the above mentioned cyanides and thiocyanates, in either simple or complexed form will be referred to as cyanide-containing compounds.

The "free" ammonia exists as the salt of a weak acid and the "fixed" ammonia exists as the chloride or thiocyanate as previously mentioned.

These weak ammonia liquors are treated prior to discharge into receiving bodies such as sewage systems by first introducing the liquors into a settling basin to remove suspended solids and then after clarification removing the phenols by bio-oxidation with special bacterial strains acclimated to phenols (see column A and B of Table I). The cyanide-containing compounds, especially the simple cyanides, are the most toxic materials present after bio-oxidation and are also the most difficult to remove. The removal of the cyanide-containing compounds and the remaining organics and ammonia is presently accomplished by chlorination which produces various toxic reaction products such as chloramines and chlorinated hydrocarbons. Chloramines adversely affect waste water quality and kill fish. Many chlorinated hydrocarbons are either known or suspected carcinogens. Thus the chlorination step merely converts one toxic material into another.

SUMMARY OF THE INVENTION

The present invention solves the problem associated with chlorination to remove cyanide-containing components from an aqueous media by an economical and efficient process comprising:

(a) contacting said cyanide-containing aqueous media with bubbles in the presence of a collector to remove a substantial amount of complexed cyanides and simple cyanides therefrom; and (b) contacting said media with ozone to substantially remove the remaining cyanides therefrom.

The present method employs a combination of an adsorptive bubble separation commonly called "adsubble separation" followed by an ozone oxidation treatment.

The adsubble technique is a relatively new method for the separation of small amounts of material from liquid media. A comprehensive description of the technique and its applications is given in Adsorptive Bubble Separation Techniques, by R. Lemlich, Academic Press, N.Y. 1972. Adsubble separations are based on differences in surface activity of the substance to be separated. In this process, molecular, colloidal or macroparticulate matter is collected and selectively adsorbed or attached to the surface of bubbles rising through the liquid whereafter it is separated and concentrated. A non-surface active material can be made surface active, for example, by association with or adherence to a surface active "collector" of the correct type. In such cases, the substance so removed is called a "colligend". The process occurs for example in the pouring of soda or beer which causes certain components of these substances, e.g., proteins, to concentrate in the foam to a degree sufficient to affect their flavor. In general, the adsubble technique acts to remove dissolved or particulate material present in very small amounts from large volumes of liquid, such as is the case in weak ammonia liquors. Its advantage lies in the fact that the separated substance is removed from the bulk liquid which is left behind, rather than the reverse situation which occurs in filtration, where all the liquid must pass through the filtering medium leaving a small amount of solid behind. This makes adsubble separation uniquely adapted to waste water purification.

The adsubble technique applied in the present invention involves the use of a collector which acts through counterionic attraction or chelation to assist in removing the bulk of the cyanide from the aqueous media. The collector is added to the cyanide-containing aqueous media and gas bubbles are passed through the media. The collector can be a surface active compound which is either cationic or which contains one or more chelating moieties. The collector picks up or attracts the specific materials in the liquid media which are to be removed, then the combination is adsorbed on the surface of the bubbles. The bubbles form a foam atop the liquid media rich in adsorbed material. The foam is then broken to separate the adsorbed material from the collector for disposal. The separated collector can then be recycled to the system for reuse. If a cationic surfactant is used as the collector, the negatively charged simple cyanides and complex cyanides (i.e. ionized cyanides and charged colloidal cyanides) are removed through counterionic attraction. The solid particulate cyanides are removed by differences in surface activity or chelation. In addition, any other negatively charged or particulate matter in the media may also be removed. If a collector having one or more chelating moieties is used, the complex cyanides are removed by virtue of bonding or complexing of the cyanides with the chelating moiety.

The treatment of coke oven effluents with ozone has been known and provides an effective means for removing phenols, cyanides, color, etc. However, the amount of ozone required to treat weak ammonia liquors, for example, on a direct basis, is so great that its use at present is uneconomic. Ozone, which has an oxidation potential greater than chlorine, reacts with almost all of the contaminants present in WAL except for ammonia itself, providing $CO_2$, $N_2$, $O_2$ and $H_2O$ as the reaction products. The residual ammonia may be reduced by other approaches such as fully automatic control of the lime slurry addition in the lime leg of the ammonia still to allow substantially complete stripping to occur. Alternatively, special bacterial strains are available which are capable of removing ammonia by bio-oxidation.

Some data on the use of ozone to treat diluted WAL are shown in Table II below.

Table II

| | Ozonation of Weak Ammonia Liquor* | | | |
|---|---|---|---|---|
| $O_3$ Dosage ppm | pH | Phenols ppm | Cyanide $CN^-$ ppm | Thiocyanate $SCN^-$ ppm |
| 0 | 6.0 | 84.4 | 2.6 | 210 |
| 502 | 4.1 | 74 | 30 | 60 |
| 1079 | 4.2 | 2.4 | 0.8 | 24 |
| 1748 | 4.1 | 0.1 | 0.5 | 11 |

*Temperature - 110° F

The data in Table II confirm the large amount of ozone required to completely treat WAL, thereby making it uneconomic. The data also indicate that thiocyanate is first converted to cyanide before it is oxidized, a fact not generally appreciated in waste water treatment.

By employing the adsubble technique as a first step in the present process, from 30 to 90% of the total cyanide can be removed from the aqueous media. This technique acts as a "roughing stage" to remove the bulk of the complexed cyanides as well as appreciable amounts of simple cyanides and other materials. The ozonation step, then, serves to remove the remaining cyanides, from the media. Due to the initial roughing stage the amount of ozone required is far less than would be required if it were used alone to remove all cyanides.

Since the bio-oxidation step is the best and most economic method for removing phenols from aqueous coke oven effluents, it is preferably employed as a pretreatment before applying the present method in removing cyanide components from such effluents even though phenols can be effectively removed by ozone. By virtue of the bio-oxidation treatment and the adsubble treatment, the amount of ozone required to treat the final effluent is reduced to even more economic levels.

DETAILED DESCRIPTION OF THE PREFERRED EMBODIMENTS

In the preferred mode of carrying out the invention, the aqueous effluent from coking operations resulting from the treatment of coke oven gas to remove tars, ammonia and light oils is first treated to remove oils, grease and suspended solids and then is bio-oxidized using bacteria acclimated to phenols to substantially reduce the phenol content. This is the most effective and inexpensive method of removing these substances to acceptable levels. The clarified effluent after bio-oxidation is next treated by an adsubble technique, to achieve a reduction of 30-90% in the total cyanide level.

The clarified effluent which contains simple and complexed cyanides in addition to many other substances in small concentrations is continuously added through an inlet near the top of a continuous flow vertical cylindrical column. An adsubble collector is added to the effluent before its introduction into the column. Air or gas bubbles are introduced into the lower portion of the column through porous septa under light pressure causing bubbles to rise through the liquid level. More effective results are achieved by employing stripping columns in which the effluent is introduced into the foam above the liquid effluent. The foam is removed by an overflow outlet whereafter it is collapsed by heat or mechanical force to yield a foamate. A portion of this foamate may be recycled to the column and the remainder treated for recovery of the collector. Recovery of the collector may be accomplished by filtration, extraction or acidification to separate the cyanides therefrom.

The preferred adsubble collectors useful in the present invention are cationic organic quaternary ammonium compounds having from eight to thirty carbon atoms such as dodecyliminodipropionic acid, hexadecyltrimethyl ammonium bromide and ethylhexadecyldimethyl ammonium bromide. Other surface active compounds containing chelating moieties such ethylene diamine tetraacetic acid radical may also be used as the collector. The pH of the effluent treated by adsubble separation should be in the range of from 6 to 11.

After adsubble treatment, the effluent is then introduced into a conventional ozone contactor. Air or oxygen normally containing from 1 to 2% of $O_3$ is bubbled through the aqueous liquid to oxidize the residual cyanides.

After the ozone treatment, the aqueous media may be discharged into receiving bodies or municipal sewage systems or recycled to steel mill operations for reuse wherever process water is needed.

The present invention is not limited to the treatment of effluents such as weak ammonia liquors from coke oven gas treatments but may also be applied in treating aqueous effluents from blast furnace blowdowns, coal conversion and other coal-carbonization processes or from electroplating baths to remove simple and complexed cyanides therefrom. Although the concentration of the cyanides in the aqueous media is not critical, the present invention is particularly useful where the concentration of total cyanide is 1% or less.

The effectiveness and economy of the invention can be further enhanced if the large load of oxidizable material in the untreated waste water effluent is reduced by pretreatments before the adsubble separation and ozone treatment are applied. These include:

1. Reducing the residual ammonia in the waste ammonia liquor leaving the ammonia still by better automatic control of the lime slurry addition in the lime leg of the ammonia still.

2. Removing the oil, grease, emulsified oils and suspended solids to lower levels by conventional surface aeration, automated skimming and clarification.

3. Lowering the total cyanide levels by a period of detention before bio-oxidation.

What is claimed is:

1. A process for removing components from an aqueous effluent derived from the treatement of coke-oven gases to remove tars, ammonia, light oils and which has been further treated to remove oil, grease and suspended solids, said effluent containing phenols and simple and metal complexed cyanides and thiocyanates comprising:
   (a) bio-oxidizing said effluent to substantially remove said phenol content;
   (b) adding to said effluent a surface active compound, said surface active compound being cationic or having a chelating moiety bonded thereto, and introducing a gas into said effluent to form gas bubbles, the amount of added surface active compound and gas being sufficient to remove from 30% to 90% of the metal complexed and simple cyanides and as a foam atop said effluent, the pH of said effluent contacted with said bubbles being in the range of from about 6 to about 11;

(c) separating said foam from said effluent; and (d) contacting the separated effluent with ozone to substantially remove the remaining simple and metal complexed cyanides and thiocyanates from said effluent.

2. The process of claim 1 wherein said cationic surface active compound is an organic quaternary ammonium compound having from 8 to 30 carbon atoms.

3. The process of claim 2 wherein said quaternary ammonium compound is selected from the group consisting of docyliminodipropionic acid, hexadecyldimethyl ammonium bromide and ethyl hexadecyldimethyl ammonium bromide.

4. The process of claim 1 wherein the contacting of said media with ozone comprises contacting said media with air or oxygen containing from 1 to 2% ozone.

5. The process of claim 1 wherein the initial total concentration of said simple and metal complexed cyanides and thiocyanates in said aqueous effluent media is less than about 1% by weight.

6. A process for removing simple and metal complexed cyanides and thiocyanates from weak ammonia liquor derived from coke-oven gas treatments comprising:

(a) adding to said liquor a cationic organic quaternary ammonium compound having from eight to thirty carbon atoms;

(b) introducing air into said liquor to form gas bubbles, the amounts of said added quaternary ammonium compound and said air being sufficient to remove from about 30% to about 90% of the simple and metal complexed cyanides and as a foam atop said effluent, and wherein the pH of said liquor to which said air is introduced is in the range of from about 6 to about 11;

(c) separating said foam from said effluent; and (d) contacting the separated effluent with air or oxygen containing from 1 to 2% ozone to substantially remove the remaining simple and metal complexed cyanides and thiocyanates from said liquor.

* * * * *

UNITED STATES PATENT AND TRADEMARK OFFICE
CERTIFICATE OF CORRECTION

PATENT NO. : 4,105,545

DATED : August 8, 1978

INVENTOR(S) : Albert Muller and John M. Schreiner

It is certified that error appears in the above-identified patent and that said Letters Patent are hereby corrected as shown below:

Col. 2, lines 65-68 (Table I), after first occurrence of "Combined Aqueous" insert -- Waste Prior To --.

Col. 2, lines 65-68 (Table I), after second occurrence of "Combined Aqueous" insert -- Waste After --.

Col. 3, lines 1-5 (Table I, continued), after first occurrence of "Combined Aqueous" insert -- Waste Prior To --.

Col. 3, lines 1-5 (Table I, continued), after second occurrence of "Combined Aqueous" insert -- Waste After --.

UNITED STATES PATENT AND TRADEMARK OFFICE
CERTIFICATE OF CORRECTION

PATENT NO. : 4,105,545
DATED : August 8, 1978
INVENTOR(S) : Albert Muller and John M. Schreiner It is certified that error appears in the above-identified patent and that said Letters Patent are hereby corrected as shown below:

Col. 7, line 5, after "and" insert -- thiocyanates --.

Col. 8, line 16, after "and" (second occurrence) insert -- thiocyanates --.

Signed and Sealed this

Seventeenth Day of April 1979

[SEAL]

Attest:

RUTH C. MASON
Attesting Officer

DONALD W. BANNER
Commissioner of Patents and Trademarks